United States Patent [19]

Froebel et al.

[11] Patent Number: 4,838,478
[45] Date of Patent: Jun. 13, 1989

[54] HALOGEN-FREE FLUX MIXTURE AND USE THEREOF

[75] Inventors: Gerd Froebel, Duesseldorf; Hans W. Stang, Duisburg, both of Fed. Rep. of Germany

[73] Assignee: Alpha Grillo-Lotsysteme GmbH, Fed. Rep. of Germany

[21] Appl. No.: 184,402

[22] Filed: Apr. 20, 1988

[30] Foreign Application Priority Data

Apr. 23, 1987 [DE] Fed. Rep. of Germany ....... 3713553

[51] Int. Cl.$^4$ .............................................. B23K 35/34
[52] U.S. Cl. ..................................... 228/223; 148/23
[58] Field of Search .................. 228/223, 224; 148/23, 148/24, 25

[56] References Cited

U.S. PATENT DOCUMENTS

| | | | |
|---|---|---|---|
| 4,278,479 | 7/1981 | Anderson et al. | 148/23 |
| 4,428,780 | 1/1984 | Schedroff | 148/23 |
| 4,708,751 | 11/1987 | Froebel et al. | 148/23 |
| 4,759,490 | 7/1988 | Ochiai | 148/23 |
| 4,762,573 | 8/1988 | Biverstedt | 228/223 |

FOREIGN PATENT DOCUMENTS

| | | |
|---|---|---|
| 2828197 | 3/1980 | Fed. Rep. of Germany . |
| 2921827 | 4/1980 | Fed. Rep. of Germany . |
| 3205315 | 8/1983 | Fed. Rep. of Germany . |
| 653939 | 1/1986 | Switzerland . |

OTHER PUBLICATIONS

Search Report of corresponding European Patent Application 88 105 958.8.

*Primary Examiner*—M. Jordan
*Attorney, Agent, or Firm*—Wegner & Bretschneider

[57] ABSTRACT

A halogen-free flux mixture for solder wires having one flux core or a plurality of flux cores based on natural and/or synthetic resins, organic acids, and optionally further additives contains from 20 to 80% by weight of resin, at least 2 organic acids in a ratio of from 1:5 to 5:1 and has an acid value of the total mixture of at least 200. Using said flux mixture, solder wires having one flux core or a plurality of flux cores of from 0.2 to 1.0% by weight can be produced which solder wires meet all requirements, including those made for the SMT technique.

11 Claims, No Drawings

HALOGEN-FREE FLUX MIXTURE AND USE THEREOF

The present invention relates to a halogen-free flux mixture for solder wire having one or more flux cores based on natural and/or synthetic resins, organic acids and optionally further additives and its use for special solder wires having one or more flux cores.

For soldering applications in electronics and microelectronics there have already been used solder wires having one or more flux cores based on natural and/or synthetic resins, organic acids and optionally further additives. In some of these wires the resins have been activated with amine hydrochlorides according to the group F-SW 26 or with carboxcylic acids according to the group F-SW 32 of German Industry standard DIN 8511. The maximum proportion of the activators therein is 10% by weight, the remainder being resin. The flux core in the solder wire mostly is from 1.5 to 4.5% by weight, whereof wires having a continuous longitudinal core mostly have a flux content within the range near the upper limit. Lower flux contents have so far been attained only by wires having been afterwards punched from outside, the holes of which are subsequently filled with flux (cf. "Weichlöten in der Elektronik", Fachverlag Schiele & Schön GmbH, Berlin, 1967, page 38).

From the DE-AS (German examined patent application) No. 28 20 656 there are known halogen-containing solder fluxes which are applicable in the form of a solid material, a paste, a liquid, a foam flux or a flux core. In column 11, lines 47 to 64, it has been asserted that these mixtures are also suitable for making a flux bore comprising from 0.5 to 5% by weight of the total weight of the solder wire. An example for such a flux bore has not been given. Investigations carried out by Applicants have resulted in the finding that at least 2 to 3% by weight of such mixtures are necessary in order to yield usable flux cores which, however, in addition are still halogen-containing.

In the German unexamined patent applications DE-OS No. 28 28 197 and 29 21 827 there have been described halogen-free rosin-based fluxes for soft soldering which contain diethanolamine as activator and, more specifically, are to be used in the form of a foam or by spraying. Thus, all of the Examples contain relatively high amounts of a solvent such as isopropanol. Only in Example 1 of the DE-OS No. 29 21 827 there has been described a solid flux which has been put into use as a solder wire fill or a solder wire sheath. However, in said Example the indication of an amount is missing. According to Applicants' investigations there are required at least from 2 to 3% by weight of such agents to be sufficiently effective. However, these fluxes, due to their high rosin contents, are not low-residue fluxes and a subsequent purification is required.

From the DE-OS No. 32 05 315 there are known fluxes for use in soft soldering which are present as a solution in isopropanol and, according to Applicants' experience, are not suitable either without the addition of isopropanol for providing a fill for a flux core if the latter amounts to less than 1% by weight of the solder wire.

From the WO No. 85/05307 there is known a cleanable solder flux which contains as essential component at least one alicyclic mono-, di- or polycarboxylic acid comprising at least one carbon ring or derivatives thereof. In Example 4 there is described a solid flux for encasing a solder molded article or as a filling for solder wires, however without an indication of the necessary amount of said solid flux, based on the weight of the solder wire. From Applicants' investigations it has become evident that of these solid fluxes there are also required at least 2 to 3% by weight in order to obtain usable results. The high content of hydrogenated resin makes it necessary to remove excessive flux by washing.

In general, solder residues will not interfere with the electrical function of printed circuits. However, with respect to the increasing adaption techniques for automatic function testing they are undesirable, since they act as insulating materials and, thus, interfere with contacting. Therefore, the residues of the flux must be removed by washing. However, this requires an additional expenditure and is becoming even more difficult due to the increasing limitations of an emission of chlorohydrocarbons and fluorohydrocarbons. Moreover, in soldering surface-mounted structural members (SMT—Surface Mounted Technology), a subsequent cleaning does not make much sense, since the distances between the structural members and the conductor plate are so small that an optimum cleaning effect is no longer ensured. In addition, a subsequent cleaning has an inherent danger of that the resin is leached out and the activators, having been rid of the insulating action of the resin, become conductive. Thus, for automatically soldering conductor plates (MELF- and SMD-equipped) on wave soldering units there are already now being demanded extremely low-residue fluxes in the liquid state which do not leave any troublesome residues. Particularly in SMT-soldering, these fluxes have also solder-technologically positive effects.

For supplementing the low-residue fluxes in the liquid form there is an increasing demand for a solder wire for after-soldering and after-equipping structural members, which solder wire in the same manner will leave as little flux residues as possible or none at all.

It is the object of the invention to develop such a halogen-free flux mixture for solder wires having one or a plurality of flux cores which meets these new and raised requirements. Since for these techniques only halogen-free fluxes can be taken into consideration, the concerned flux mixtures are only flux mixtures based on natural and/or synthetic resins, organic acids, and optionally further additives which should be halogen-free and free from amine groups.

This object surprisingly could be attained by a flux mixture wherein (a) the resin content is about 20 to 80% by weight;

(b) at least 2 organic acids are present in a ratio of from 1:5 to 5:1; and (c) the total mixture has an acid value of at least 200.

The resin content is preferably about 40 to 75% by weight. The natural resin may be rosin. Synthetic resins used may be modified rosin and fully synthetic resins. The organic acids may be the acids conventionally usable as activators with 4 to 12 carbon atoms. A mixture of adipic acid and suberic acid in a ratio of from 7:3 to 1:1 has proven to be particularly valuable. Preferred for use as the organic acids are aliphatic acids with 4 to 12 carbon atoms which are alkanoic or alkanedicarboxylic acids.

As further additives plasticizers which are not decomposed under the conditions of soldering have proven valuable. Particularly useful is sebacic acid bis-2-ethylhexylester in an amount up to 10% by weight.

As further additives there are particularly suitable tin salts of organic acids. These are preferably added in amounts of up to 3%, and preferably in amounts of from 0.2 to 2.0%. Preferred tin salts are those of stearic and adipinic acid.

Finally it is required that the total mixture has an acid value of at least 200 to be still sufficiently active. In spite of this acid value the flux mixtures of the invention are not corrosive, apparently because a sufficient amount of resin is present.

Surprisingly, using this new flux mixture renders it possible to prepare solder wires having a flux core of less than 1% by weight. In spite of this substantially lower proportion of flux mixture in the solder wire having one or more flux cores, this low amount of from 0.2 to 1.0% by weight of flux is sufficient to warrant good and reliable soldering and leaves no undesirable flux residues. If desired, solder wires having higher flux contents could also be produced using said flux mixture; however, this low amount of flux mixture is absolutely sufficient. Due to the lower amount of flux mixture in the solder wire, the development of smoke is also significantly reduced over that of conventional solder wires, and so is the inconvenience in processing caused thereby to the staff. Furthermore, no undesirable crack products are formed in processing on the tip of soldering iron, so that the operations may be carried out fast and trouble-free. In after-soldering SMT assemblies no after-cleaning of the soldering points is needed to conduct the automatic function testing. The good wetting property ensures an unobjectionable soldering even with extremely small SMT contact areas.

The flux mixture according to the invention may preferably be incorporated in the solder wires in the form of one central flux core. It is not required to produce solder wires comprising a plurality of more expensive flux cores, which have been developed specifically in order to reduce the drawbacks of previous fluxes in solder wire.

A particularly preferred embodiment of the flux of the invention which meets optimally all requirements made for such flux consists of from 20 to 26% by weight of adipic acid, 11 to 15% by weight of suberic acid, 3 to 7% by weight of sebacic acid bis-2-ethylhexylester, 0.5 to 1.5% by weight of tin stearate and/or tin adipate, the percent balance being a resin, and preferably rosin (colophony). Using this flux mixture solder wires having a flux core of from 0.2 to 0.8% by weight can be manufactured which, for example, may be employed for soldering SMT structural members without after-cleaning being required. No malfunction is observed with such flux.

We claim:

1. A halogen-free flux mixture for solder wires having one flux core or a plurality of flux cores based on natural and/or synthetic resins, organic acids, and optionally further additives, characterized in that
   (a) the resin content is about 20 to 80% by weight;
   (b) at least 2 organic acids are present in a ratio of about 1:5 to 5:1; and
   (c) the total mixture has an acid value of at least 200.

2. Halogen-free flux mixture according to claim 1, characterized in that the resin content is of 40 to 75% by weight.

3. Halogen-free flux mixture according to claim 1, wherein a mixture is present of adipic acid and suberic acid in a ratio of 7:3 to 1:1.

4. Halogen-free flux mixture according to claim 2, wherein a mixture is present of adipic acid and suberic acid in a ratio of 7:3 to 1:1.

5. Halogen-free flux mixture according to claim 1, wherein plasticizers and/or tin salts of organic acids are present as further additives.

6. Halogen-free mixture according to claim 2, wherein plasticizers and/or tin salts of organic acids are present as further additives.

7. Halogen-free flux mixture according to claim 3, wherein plasticizers and/or tin salts of organic acids are present as further additives.

8. Method of preparing a solder wire having a flux core of about 0.2 to 1% by weight which comprises using a halogen-free flux mixture of claim 1.

9. Method of preparing a solder wire having a flux core of about 0.2 to 1% by weight which comprises using a halogen-free flux mixture of claim 2.

10. Method of preparing a solder wire having a flux core of about 0.2 to 1% by weight which comprises using a halogen-free flux mixture of claim 3.

11. Method of preparing a solder wire having a flux core of about 0.2 to 1% by weight which comprises using a halogen-free flux mixture of claim 4.

* * * * *